US012216604B2

(12) United States Patent
Xu et al.

(10) Patent No.: US 12,216,604 B2
(45) Date of Patent: Feb. 4, 2025

(54) VIRTUAL WIRE PROTOCOL FOR TRANSMITTING SIDE BAND CHANNELS

(71) Applicant: Mellanox Technologies, Ltd., Yokneam (IL)

(72) Inventors: Rui Xu, Marlborough, MA (US); Mark Rosenbluth, Uxbridge, MA (US); Diane Orf, Natick, MA (US); Michael Cotsford, Medway, MA (US); Shreya Tekade, Framingham, MA (US)

(73) Assignee: Mellanox Technologies, Ltd., Yokneam (IL)

( * ) Notice: Subject to any disclaimer, the term of this patent is extended or adjusted under 35 U.S.C. 154(b) by 7 days.

(21) Appl. No.: 17/958,111

(22) Filed: Sep. 30, 2022

(65) Prior Publication Data

US 2024/0111702 A1  Apr. 4, 2024

(51) Int. Cl.
*G06F 13/00* (2006.01)
*G06F 13/24* (2006.01)
*G06F 13/40* (2006.01)

(52) U.S. Cl.
CPC .......... *G06F 13/4045* (2013.01); *G06F 13/24* (2013.01)

(58) Field of Classification Search
CPC ............................ G06F 13/4045; G06F 13/24
See application file for complete search history.

(56) References Cited

U.S. PATENT DOCUMENTS

| | | | |
|---|---|---|---|
| 6,680,915 B1* | 1/2004 | Park | G06F 15/16 370/254 |
| 7,006,444 B1* | 2/2006 | Stone | H04L 12/2854 370/255 |
| 9,674,114 B2* | 6/2017 | Park | H04L 49/109 |
| 2012/0311221 A1* | 12/2012 | Freking | G06F 13/4081 710/313 |
| 2016/0088615 A1* | 3/2016 | Soyak | H04W 72/27 370/254 |
| 2017/0353384 A1* | 12/2017 | Chayat | G06F 9/45558 |
| 2023/0216586 A1* | 7/2023 | Minoguchi | H04B 10/272 398/147 |

* cited by examiner

*Primary Examiner* — Henry Tsai
*Assistant Examiner* — Kim T Huynh
(74) *Attorney, Agent, or Firm* — Lowenstein Sandler LLP

(57) ABSTRACT

A virtual wire system includes a source device, a target device, and a mesh interface connecting the source device and the target device. One or more mesh messages are transmitted over the mesh interface from the source device to the target device, and the one or more mesh messages indicate a change in a value of a signal level at the source device. The source device may include a plurality of virtual wire sources, a virtual wire encoder, and a virtual wire arbiter operatively coupled to the plurality of virtual wire sources and the virtual wire encoder. The virtual wire arbiter is configured to determine whether information from a virtual wire source should be transmitted to the virtual wire encoder. The virtual wire encoder is configured to receive information from the virtual wire arbiter, combine the information into a single virtual wire message, and transmit the single virtual wire message to a first mesh interface component in the source device.

19 Claims, 9 Drawing Sheets

VIRTUAL WIRE PROTOCOL FOR TRANSMITTING SIDE BAND CHANNELS

TECHNICAL FIELD

Embodiments of the disclosure relate generally to processors, and more specifically, relate to a virtual wire system for communicating between two or more devices in a processor.

BACKGROUND

Network communication systems can include multiple devices coupled to a server and/or data processing units (DPUs) via a network—e.g., USB, Ethernet, wireless, peripheral component interconnect express (PCIe), etc. Devices of the network communication system can request information or data from the server or DPU. The DPU can include a system-on-chip (SOC) that manages the requests and an interface that enables the SOC to access the information from one or more memory devices (e.g., storage devices) of the DPU—e.g., memory devices external to the SOC. In a typical DPU, a physical wire connects directly from an output of a source device to an input of a target device. However, communication and signaling between a source device and target device may be limited in a physical wire because the signaling has to pass through every device on the shortest path to the target device.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Advantageously, aspects of the present disclosure can address the deficiencies above and other challenges by providing a virtual wire system for communicating between two devices in a processor (e.g., DPU). Aspects of the present disclosure are directed to a virtual wire system including a source device, a target device, and a mesh interface connecting the source device and the target device. One or more mesh messages are transmitted over the mesh interface from the source device to the target device. The mesh messages may indicate a change in a value of signal level at the source device (e.g., an interrupt signal). The source device may include a plurality of virtual wire sources, a virtual wire encoder, and a virtual wire arbiter operatively coupled to the plurality of virtual wire sources and the virtual wire encoder. The virtual wire arbiter is configured to determine whether information from a virtual wire source should be transmitted to the virtual wire encoder based on a predetermined condition. The virtual wire encoder receives information from the virtual wire arbiter, combines the information into a single virtual wire message, and transmits the single virtual wire message to a first mesh interface buffer in the source device. The first mesh interface buffer receives the single virtual wire message, generates a mesh message including the single virtual wire message, and transmits the mesh message including the single virtual wire message over a physical link of the mesh interface.

Figure 1:
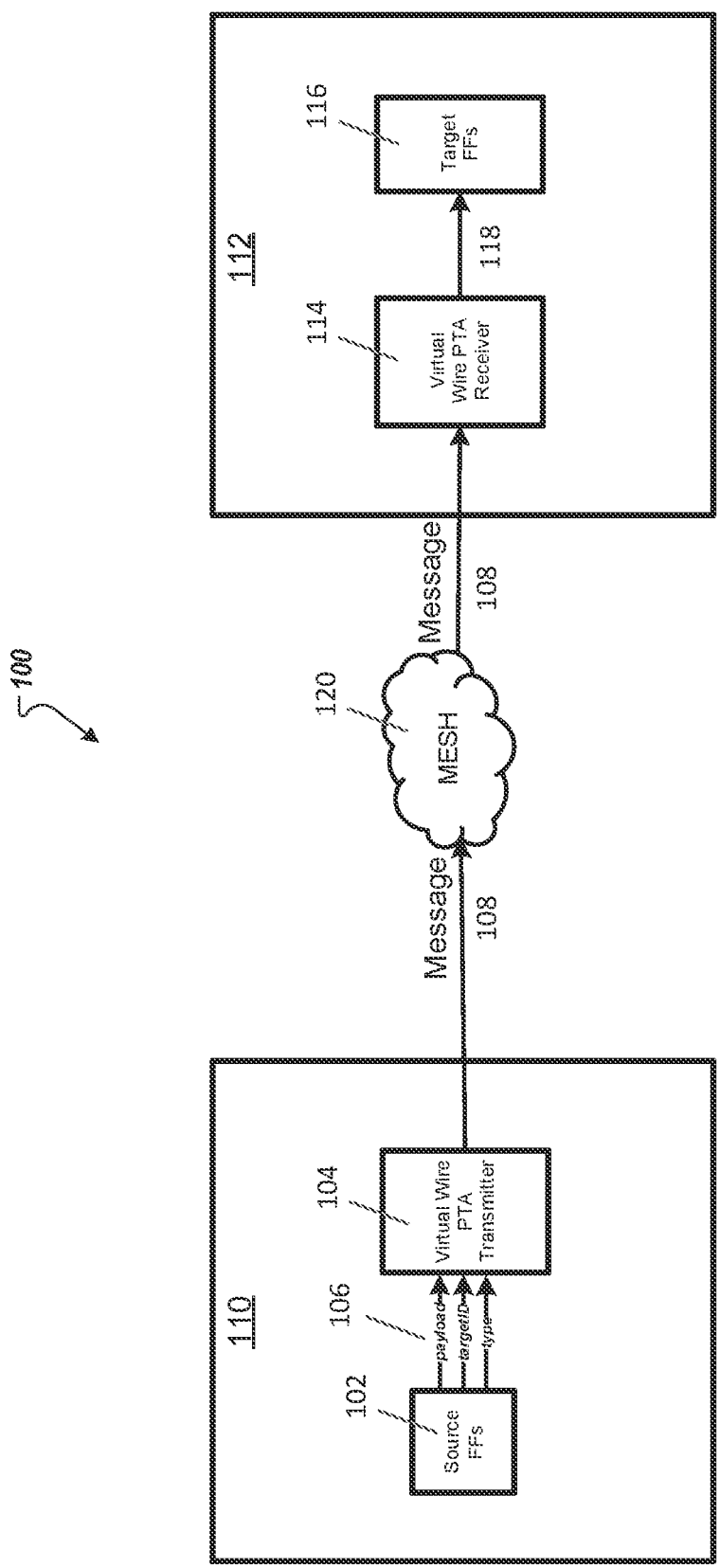
FIG. 1 illustrates an example virtual wire system in accordance with some embodiments of the present disclosure.

FIG. 1 illustrates a virtual wire system 100 including a source device 110 and a target device 112, in accordance with some embodiments of the present disclosure. Source device 110 and target device 112 may include one or more processors, memory controllers, graphics processors, last level cache tiles, public key accelerators, regular expression tiles, management gateways, peripheral component interconnect express (PCIE) request nodes, and memory subsystems. Source device 110 may be connected to target device 112 via a mesh network 120. The mesh network 120 may include a mesh interface that connects the source device 110 and the target device 112. In some embodiments, the mesh interface may be a two-dimensional compute subsystem (CSS) interface or an Enhanced Serial Peripheral Interface (eSPI), for example.

Source device 110 may include a plurality of virtual wire source flip-flops 102 that transmit information 106 to a virtual wire protocol translation adapter (PTA) transmitter 104. Information 106 may include information elements such as a payload, a target identifier (targetID), an information type identifier, a source identifier, a protocol identifier, or a combination thereof. The transmitter 104 encloses a message 108 in a set of codes to allow the transfer of the message or signal across the mesh interface 120. For example, when the signal level at a source flip-flops 102 changes, the PTA transmitter 104 sends a message 108 to the target device 112 with the new value. The message payload can be multiple bits, so a single message can indicate changes in values of multiple signals. The message can be used at the target device to update the state of the signals in the source flip-flop circuit or latch element.

The virtual wire system 100 may include a target device 112, which may include one or more processors, memory controllers, graphics processors, last level cache tiles, public key accelerators, regular expression tiles, management gateways, peripheral component interconnect express (PCIE) request nodes, and memory subsystems. The target device 112 may include a virtual wire PTA receiver 114 configured to receive the mesh message 108, decode at least a payload 118 from the single virtual wire message 108, and transmit at least the payload 118 to one or more virtual wire target flip-flops 116. In some embodiments, the virtual wire PTA receiver 114 may decode the information 106 in its entirety, including the payload, target identifier, and type identifier.

Figure 2:
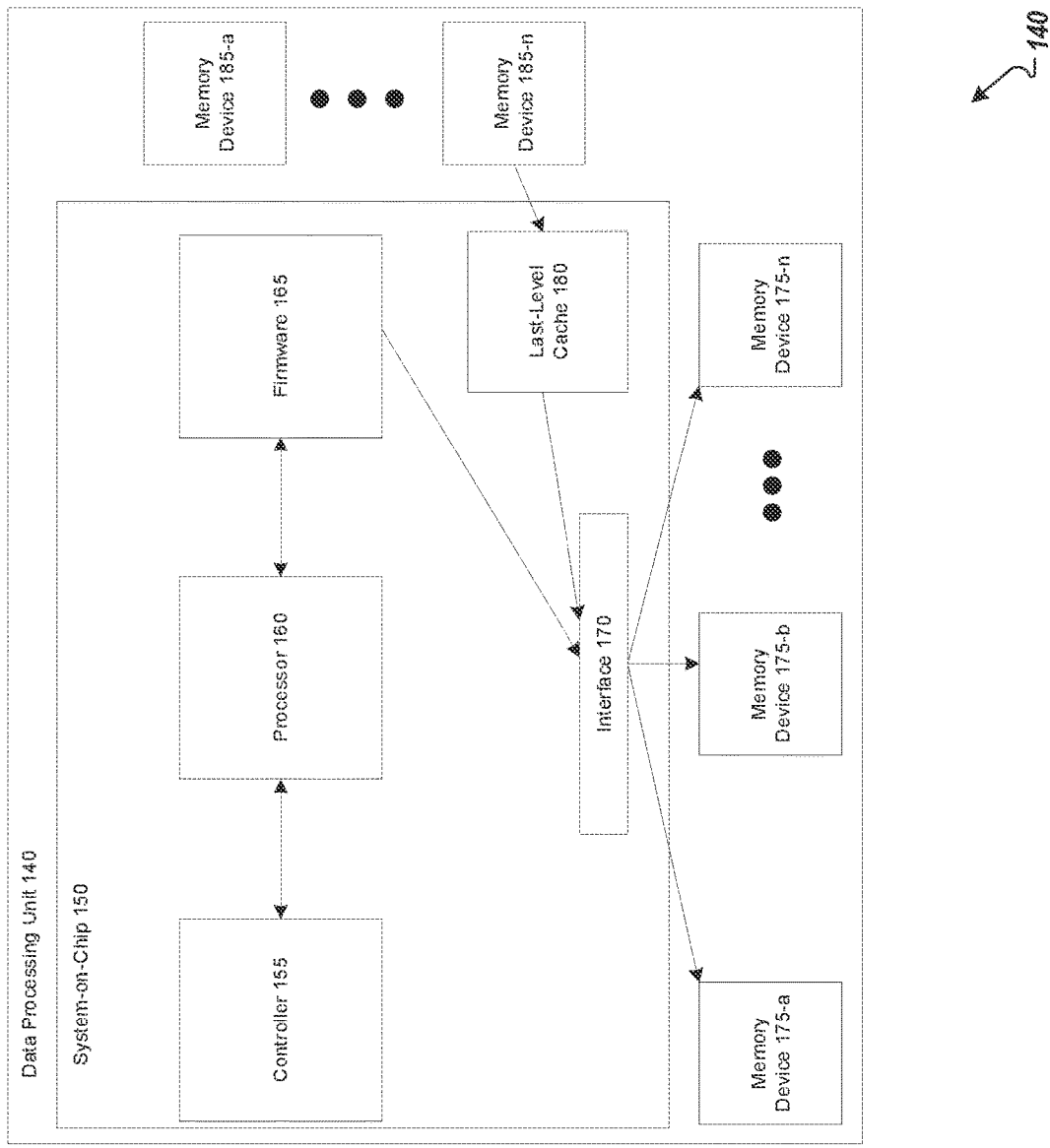
FIG. 2 is an example data processing unit, in accordance with at least some embodiments.

FIG. 2 illustrates an example DPU 140 that may include a virtual wire system as described in FIG. 1. In at least one embodiment, DPU 140 can be example of a network interface controller (NIC). In at least one embodiment, DPU 140 can be examples of an NVIDIA® BlueField® data processing unit (DPU). As illustrated in FIG. 2, in some embodiments, the DPU 140 can include a system-on-chip (SOC) 150, memory devices 175, and memory devices 185. In at least one embodiment, the DPU 140 support directly reading or writing to attached local peripheral memory devices 175 (e.g., NVM express (NVMe) drives or other storage devices) via a storage subsystem in response to remote initiator requests (e.g., content transfer requests received from devices over a network to which the data communication device is connected). In at least one embodiment, the DPU 140 can include memory devices 185 (e.g., a random-access memory (RAM) (e.g., Double Data Rate (DDR) memory)) which are used to transfer content between the data communication device and the memory devices 175, and vice-versa. In some embodiments, the SOC 150 can further include a controller 155 and firmware 165. In some embodiments, the SOC 150 can include one or more processors 160 (e.g., a single or multi-core central processing unit (CPU)) to facilitate processing data. In such embodiments, the multi-core CPU arm architecture can couple the controller 155 with the firmware 165. In at least one embodiment, the SOC 150 can include a last level cache (LLC) 180 shared by the controller 155 and firmware 165. In at least one example, the controller 155 is an example of a network interface controller coupling the DPU 140 to the user device 105 or a computer network (e.g., cloud network).

Figure 3:
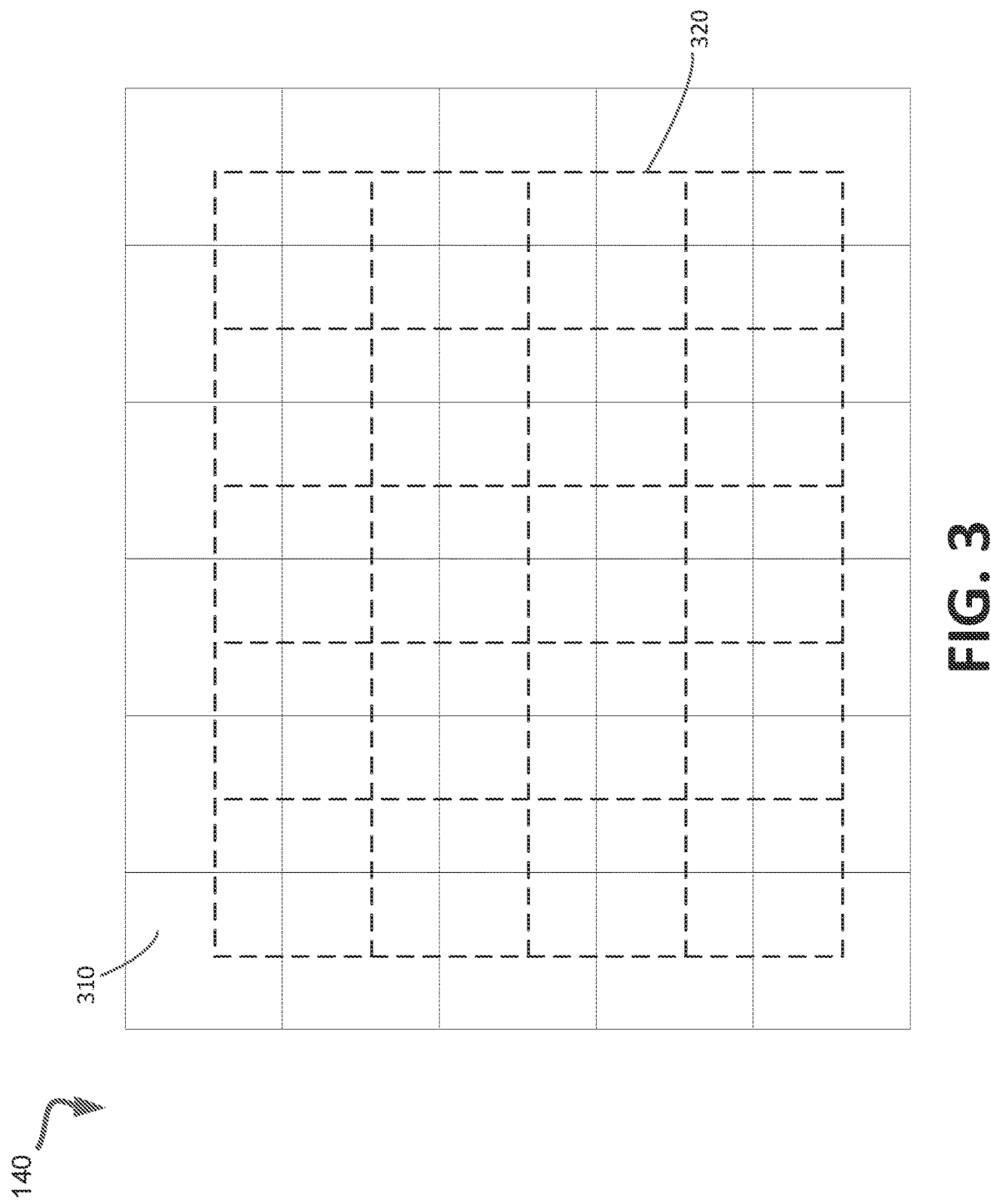
FIG. 3 illustrates a topology of an example virtual wire system in accordance with some embodiments of the present disclosure.

FIG. 3 illustrates a topology of an example virtual wire system in accordance with some embodiments of the present disclosure. DPU 140 has an array of functional units 310 (e.g., processors 160) connected by a mesh network 320. Each of the functional units 310 may include one or more processors, memory controllers, graphics processors, last level cache tiles, public key accelerators, regular expression tiles, management gateways, peripheral component interconnect express (PCIE) request nodes, and memory subsystems. The mesh network 320 may include a mesh interface that connects each of the functional units 310. In some embodiments, the mesh interface may be a two-dimensional compute subsystem (CSS) interface or an Enhanced Serial Peripheral Interface (eSPI), for example.

Figure 4:
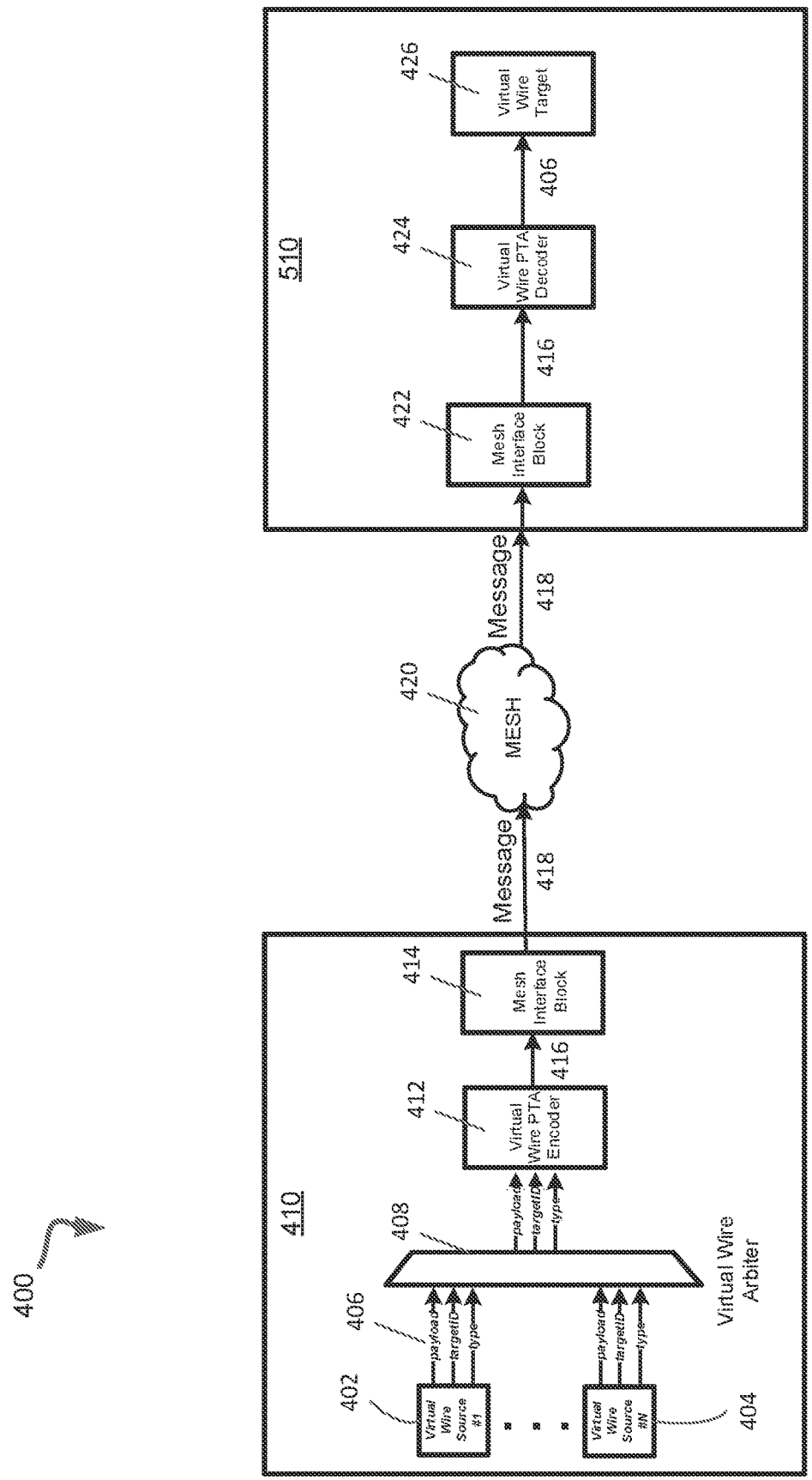
FIG. 4 illustrates a virtual wire system in accordance with some embodiments of the present disclosure.

FIG. 4 illustrates a virtual wire system 400 including a source device 410 and target 510, in accordance with some embodiments of the present disclosure. Source device 410 and target 510 may include one or more processors, memory controllers, graphics processors, last level cache tiles, public key accelerators, regular expression tiles, management gateways, peripheral component interconnect express (PCIE) request nodes, and memory subsystems. Source device 410 may be connected to target device 510 via a mesh network 420. The mesh network 420 may include a mesh interface that connects the source device 410 and the target device 510. In some embodiments, the mesh interface may be a two-dimensional compute subsystem (CSS) interface or an Enhanced Serial Peripheral Interface (eSPI), for example.

Source device 410 may include a plurality of virtual wire sources 402-404. In one embodiment, the plurality of virtual wire sources 402-404 may include data registers (e.g., a flip-flop circuit or a latch element) for storing a change in value of a signal level. Source device 410 may also include a virtual wire arbiter 408 that receives information 406 from the virtual wire sources 402-404 and selects information 406 from the virtual wire sources 402-404 to be transmitted to a virtual wire protocol translation adapter (PTA) encoder 412. The selection may be based on a predefined condition. For example, the virtual wire arbiter 408 may only select signals that indicate a change in value of a signal level at the source 402. Information 406 may include information elements such as a payload, a target identifier (targetID), an information type identifier, a source identifier, a protocol identifier, or a combination thereof. The encoder 412 encloses a message or signal in a set of codes to allow the transfer of the message or signal across the mesh interface 420. For example, when the signal level at a source 402 changes, the encapsulator or encoder 412 arbitrates for the SkyMesh® coherent on-chip interconnect channel, and then sends a message to the target device with the new value. The message payload can be multiple bits, so a single message can indicate changes in values of multiple signals. The message can be used at the target device to update the state of the signals in the source flip-flop circuit or latch element. In some embodiments, virtual wire messages can be sent without any flow control because they only update the state of the source device's signals at the target device. Therefore, a new message can always be accepted by the target device. Although targetID and information type are provided as input examples in this embodiment, these information elements may not be needed by a target device. In some embodiments, the virtual wire encoder 412 may be used to capture any number of changes to a bunch of wires and generate flits (messages) to the SkyMesh channel, and it can support virtual wire messages up to 80 bits wide or more.

The virtual wire encoder 412 is configured to receive information 406 from the virtual wire arbiter 408, combine the information 406 into a single virtual wire message 416, and transmit the single virtual wire message 416 to a mesh interface component 414 in the source device 410. The mesh interface component 414, which may include a buffer, for example, is further configured to receive the single virtual wire message 416, generate a mesh message 418 including the single virtual wire message 416, and transmit the mesh message 418 over a physical link of the mesh interface 420.

The virtual wire system 400 may include a target device 510, which may include one or more processors, memory controllers, graphics processors, last level cache tiles, public key accelerators, regular expression tiles, management gateways, peripheral component interconnect express (PCIE) request nodes, and memory subsystems. The target device 510 may include a mesh interface component 422 (e.g., a buffer) configured to receive the mesh message 418, decode the single virtual wire message 416 from the mesh message 418, and transmit the single virtual wire message 416 to a virtual wire PTA decoder 424. The virtual wire PTA decoder 424 may be configured to receive the single virtual wire message 416, decode at least a payload from the single virtual wire message 416, and transmit at least the payload to a virtual wire target 426 (e.g., a flip flop circuit or a latch element) in the target device 510. In some embodiments, the virtual wire PTA encoder 424 may decode the information 406 in its entirety, including the payload, target identifier, and type identifier. In some embodiments, the source device 410 and the target device 510 may also include protocol translation adapters (PTAs), and may include operations including receiving, by the one or more PTAs, configuration information to configure the one or more PTAs. The configuration information may further include traffic information to direct one or more messages and transmit the node identifier and the one or more messages to the target device 510 over the two-dimensional mesh network 420.

In some embodiments, the virtual wire system may be used to send an interrupt from a source processor core to a Generic Interrupt Controller (GIC). A GIC takes interrupts from peripherals, prioritizes them according to a predefined condition, and delivers them to the appropriate target processor core. In another example, the virtual wire system may be used for multicasting CoreSight® security level information from a configuration register in Rshim to one or more processor cores. For example, when the signal level at the source device changes, the encapsulator arbitrates for the SkyMesh® coherent on-chip interconnect channels and then sends a message to the target device with the new value. The message payload can be multiple bits, so a single message can indicate changes in values of multiple signals. The message can be used at the target to update the state of the signals in the flip-flop circuit or latch element. In some embodiments, virtual wire messages can be sent without any flow control because they only update the state of the source device's signals at the target device. Therefore, a new message can always be accepted by the target device.

As described above, the virtual wire encapsulator arbitrates for the use of SkyMesh® channels, which means that if a signal changes state, and then changes state again before the message is sent, then both transitions may be lost at the target because the target can see no transition; just a constant value. Therefore, a virtual wire tunnel may be used only for signals that are not sensitive to this loss of information.

Figure 5:
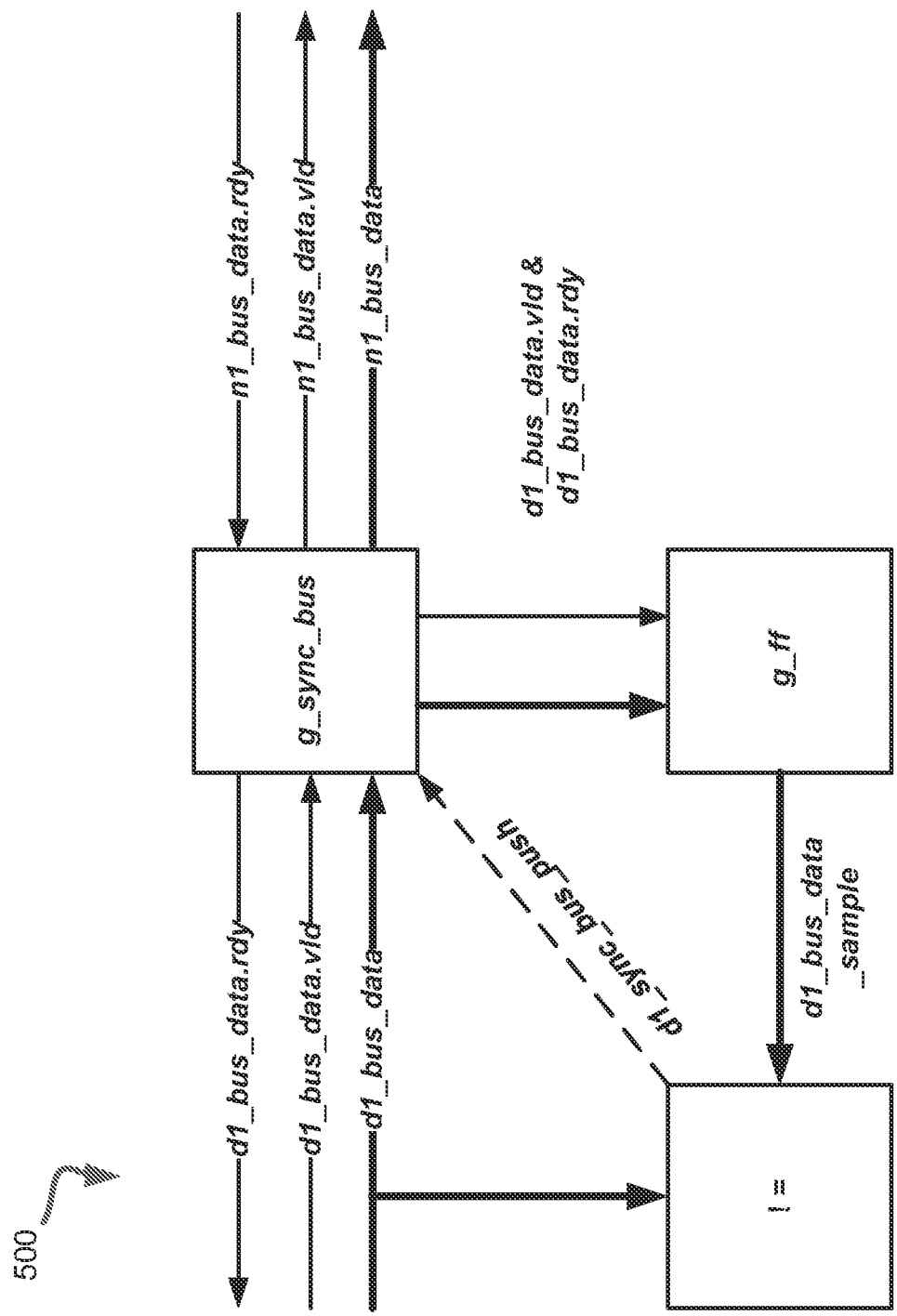
FIG. 5 illustrates a block diagram of a virtual wire encoder in accordance with some embodiments of the present disclosure.

FIG. 5 illustrates a block diagram of a virtual wire encoder 500 in accordance with some embodiments of the present disclosure. The ready/valid protocol illustrated here is an example handshake process for one component (e.g., source device) to transmit data to another component (e.g., target device) in the same clock domain. There is a unidirectional data flow between the source device and the target device; the source device needs to have "valid" data, and the target device needs to be "ready" to receive the data. It should be noted here that the "ready" and "valid" signals are single wires, but the "data" signal is a bus composed of multiple wires transmitting in parallel. In this example, the thick black lines indicate the data payload, while the dotted line indicates the control signals. In this example, the term "g_sync_bus" represents an adaptive synchronization module (e.g., a processor) configured to adapt an input rate of a target device to the output rate of a source device (e.g., a graphics card). When a virtual wire bus is received at the g_sync_bus block, it is compared with the sampled old wire bus, and if they are different, then g_sync_bus asserts a vld (e.g., valid) signal and triggers generation of a new virtual wire flit (e.g., message). When the virtual wire flit (e.g., message) is sent by g_sync_bus, the block also generates an ack (e.g., acknowledgment) to the source device. In most cases, the source device does not need the ack (e.g., acknowledgment) signal. However, in the case of rshim, which may be a processor tile designated to handle unprogrammed registers and respond with a timeout function, it may need the ack (e.g., acknowledgment) for its own purpose (e.g., responding with a timeout function). As illustrated herein, the clock domain crossing (CDC) is performed inside a virtual wire PTA encoder, and the virtual wire PTA encoder may not capture back-to-back bus bits change; however, it may guarantee that the receiver can view the last change.

Figure 6:
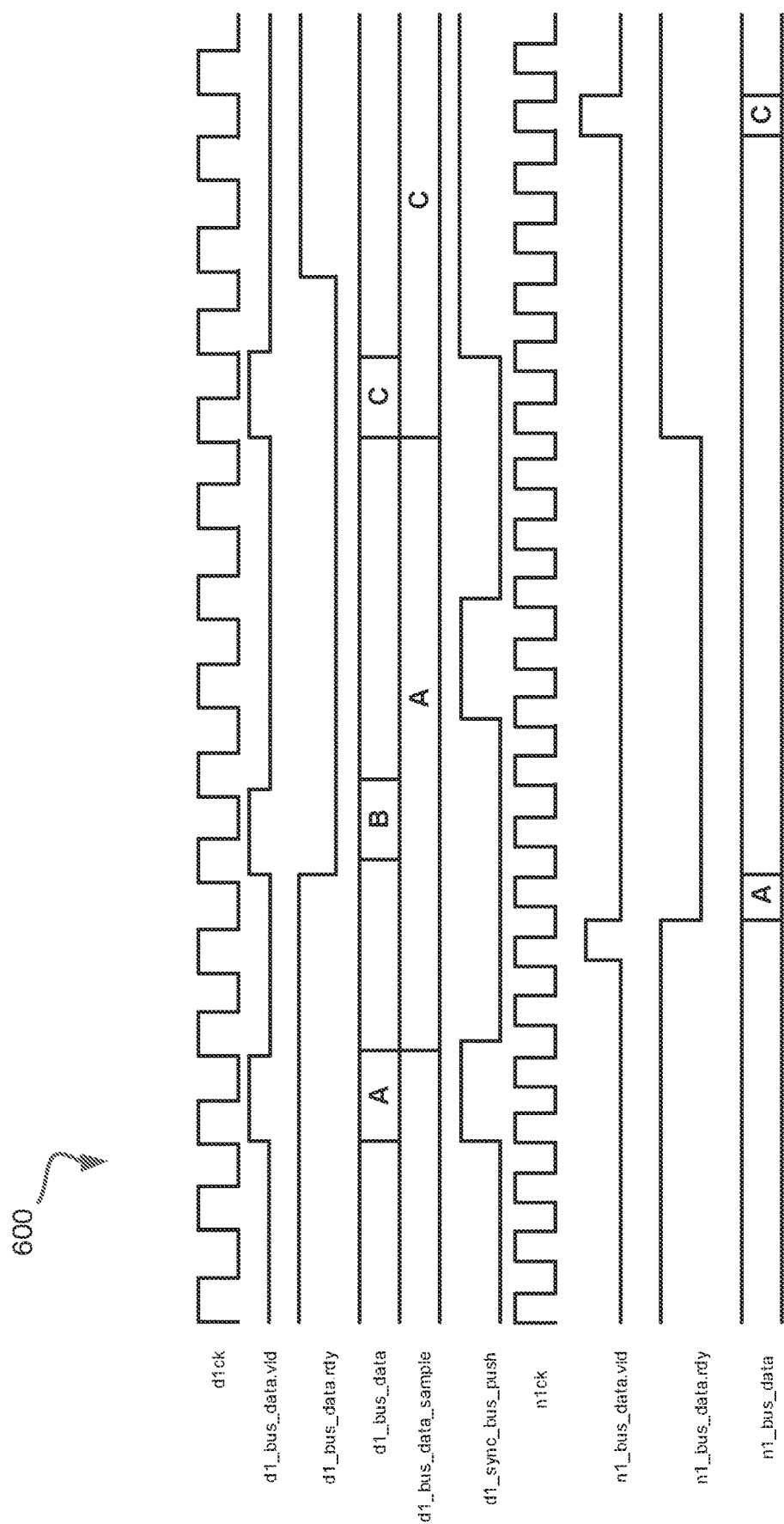
FIG. 6 illustrates an example waveform of a virtual wire encoder in accordance with some embodiments of the present disclosure.

FIG. 6 illustrates an example waveform 600 of a virtual wire encoder in accordance with some embodiments of the present disclosure. In this example, a virtual wire flit (e.g., message) with payload A arrives at the virtual wire PTA encoder, and since there is no backpressure from the mesh (n1_bus_data.rdy==1), the payload is accepted and sent to mesh after clock domain crossing (CDC). Meanwhile, the sampling flip-flop updates the value to be A. When the second virtual wire flit (e.g., message) with payload B arrives, due to the backpressure, even if the content is different, the data may not be sent to mesh as well as the asynchronous First-In-First-Out (FIFO), and the sampling flip-flop is not updated since that the payload B is not sent out. When the third flit (e.g., message) arrives, there is no backpressure from the mesh, and so it can be successfully sent to the mesh, and sampling flip-flop gets updated. In some embodiments, the virtual wire data is associated with a 4-bit virtual wire ID. For example, the virtual wire ID can be used by the target device to distinguish the type of the virtual wire message. Correspondingly, there is the virtual wire decoder on the target device side. The target device extracts the data payload from the tunnel flit (e.g., message) and handles the CDC. Unlike the rest of the PTAs, the targetID is driven from the cluster rather than the PTA. Meanwhile, the virtual wire PTA encoder has another four bits to identify the virtual wire message type (e.g., VW_ID). Consequently, the virtual wire decoder has the output of VW_ID as well as the source ID of the received message. Therefore, virtual wire PTAs can be shared by a couple of tunnels in the cluster at the same time, and the target device only requires a combination of VW_ID and source ID to identify where the message is coming from so that the target device can decide the right destination for the incoming virtual wire flits.

Figure 7:
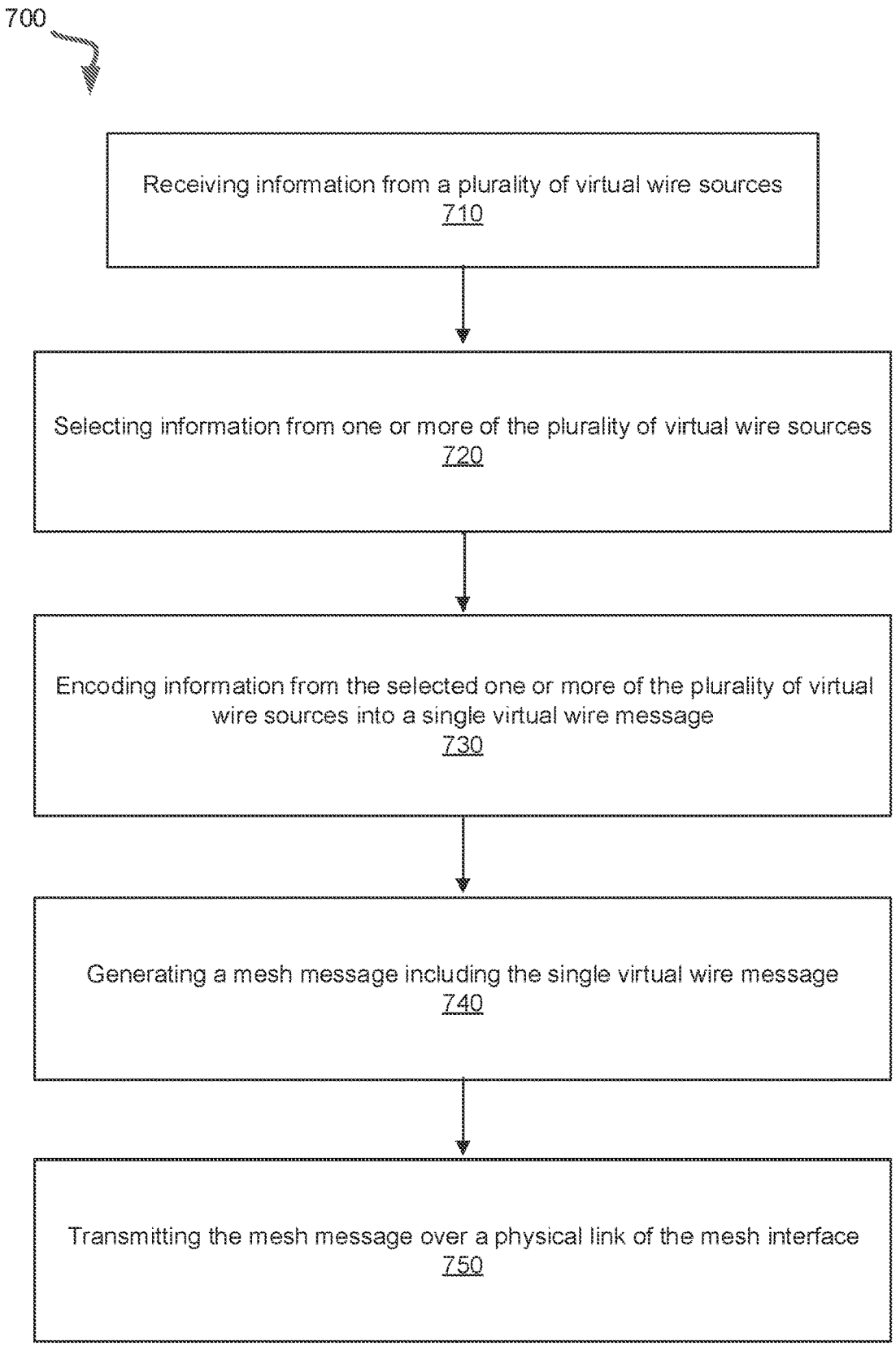
FIG. 7 illustrates example operations in a method for transmitting side band channels in accordance with some embodiments of the present disclosure.

FIG. 7 illustrates example operations in a method 700 for transmitting side band channels in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, a source device (e.g., source device 410) receives information from virtual wire sources within the source device. The source device may be connected to the target device via a mesh network. The mesh network may include a mesh interface that connects the source device and the target device. In some embodiments, the mesh interface may be a two-dimensional compute subsystem (CSS) interface or an Enhanced Serial Peripheral Interface (eSPI), for example. The source device may include one or more processors, memory controllers, graphics processors, last-level cache tiles, public key accelerators, regular expression tiles, management gateways, peripheral component interconnect express (PCIE) request nodes, and memory subsystems. At operation 720, the virtual wire arbiter (e.g., arbiter 408) selects information from the plurality of virtual wire sources to be transmitted to a virtual wire protocol translation adapter (PTA) encoder. The plurality of virtual wire sources may include data registers (e.g., a flip-flop circuit or a latch element) for storing a change in value of a signal level. The source device may also include a virtual wire arbiter that receives information from the virtual wire sources and selects information from the virtual wire sources to be transmitted to a virtual wire protocol translation adapter (PTA) encoder. The selection may be based on a predefined condition. For example, the virtual wire arbiter may only select signals that indicate a change in value of a signal level at the source. Information may include information elements such as a payload, a target identifier, an information type identifier, a source identifier, a protocol identifier, or a combination thereof. At operation 730, the encoder encloses a message or signal in a set of codes to allow the transfer of the message or signal across the mesh interface. For example, when the signal level at a source changes, the encapsulator or encoder arbitrates for the SkyMesh® coherent on-chip interconnect channel, and then sends a message to the target device with the new value. The message payload can be multiple bits, and so a single message can indicate changes in values of multiple signals. The message can be used at the target device to update the state of the signals in the source flip-flop circuit or latch element. In some embodiments, virtual wire messages can be sent without any flow control because they only update the state of the source device's signals at the target device. Therefore, a new message can always be accepted by the target device. Although targetID and type are provided as input examples in this embodiment, these information elements may not be needed by a target device. In some embodiments, the virtual wire encoder may be used to capture any number of changes to a bunch of wires and generate flits (messages) to the SkyMesh channel, and it can support virtual wire messages up to 80 bits wide or more.

At operation 730, the virtual wire encoder receives the information from the virtual wire arbiter, combines the information into a single virtual wire message, and transmits the single virtual wire message to a mesh interface component in the source device. At step 740, the mesh interface component (e.g., component 414), which may include a buffer, for example, receives the single virtual wire message, generate a mesh message including the single virtual wire message, and transmit the mesh message over a physical link of the mesh interface, at operation 750.

Figure 8:
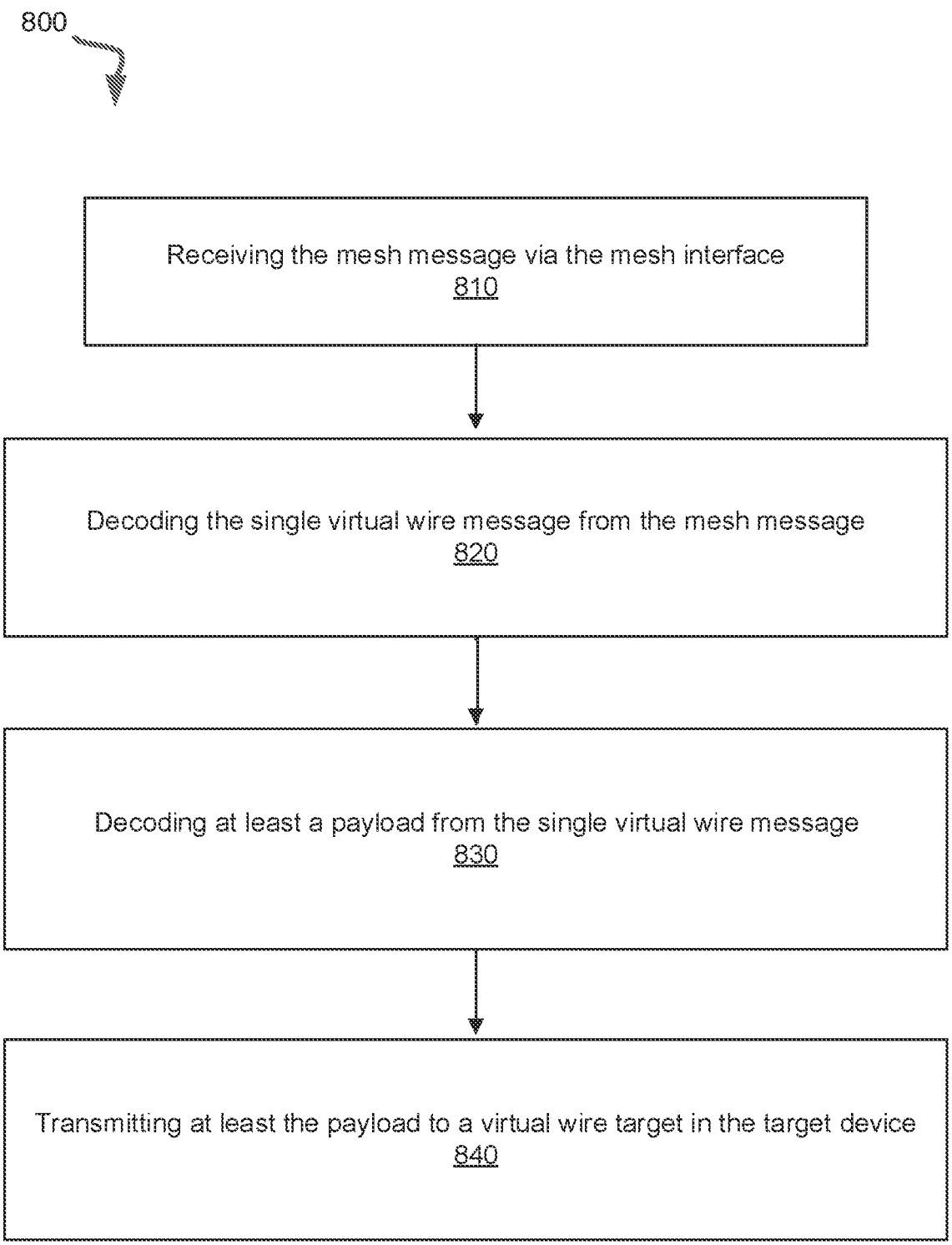
FIG. 8 illustrates example operations in a method for receiving side band channels in accordance with some embodiments of the present disclosure.

FIG. 8 illustrates example operations in a method 800 for receiving side band channels in accordance with some embodiments of the present disclosure. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 810, the target device receives the mesh message via the mesh interface. The target device may include one or more processors, memory controllers, graphics processors, last-level cache tiles, public key accelerators, regular expression tiles, management gateways, peripheral component interconnect express (PCIE) request nodes, and memory subsystems. At operation 820, the mesh interface block in the target device may decode the single virtual wire message from the mesh message and transmit the single virtual wire message to a virtual wire PTA decoder. At operation 830, the virtual wire PTA decoder may receive the single virtual wire message, decode at least a payload from the single virtual wire message, and transmit at least the payload to a virtual wire target (e.g., a flip flop circuit or a latch element) in the target device, at operation 840. In some embodiments, the virtual wire PTA encoder may decode the information in its entirety, including the payload, target identifier, and type identifier. In some embodiments, the source device and the target device may also include protocol translation adapters (PTAs), and may include operations including receiving, by the one or more PTAs, configuration information to configure the one or more PTAs. The configuration information may further include traffic information to direct one or more messages and transmit the node identifier and the one or more messages to the target device over the two-dimensional mesh network.

In some embodiments, the virtual wire system may be used to send an interrupt from a source processor core to a Generic Interrupt Controller (GIC). A GIC takes interrupts from peripherals, prioritizes them according to a predefined condition, and delivers them to the appropriate target processor core. In another example, the virtual wire system may be used for multicasting CoreSight® security level information from a configuration register in Rshim to one or more processor cores. For example, when the signal level at the source device changes, the encapsulator arbitrates for the SkyMesh® coherent on-chip interconnect channels, and then sends a message to the target device with the new value. The message payload can be multiple bits, and so a single message can indicate changes in values of multiple signals. The message can be used at the target to update the state of the signals in the flip-flop circuit or latch element. In some embodiments, virtual wire messages can be sent without any flow control because they only update the state of the source device's signals at the target device. Therefore, a new message can always be accepted by the target device. As described above, the virtual wire encapsulator arbitrates for the use of SkyMesh® channels, which means that if a signal changes state, and then changes state again before the message is sent, then both transitions may be lost at the target because the target can see no transition; just a constant value. Therefore, a virtual wire tunnel may be used only for signals that are not sensitive to this loss of information.

Figure 9:
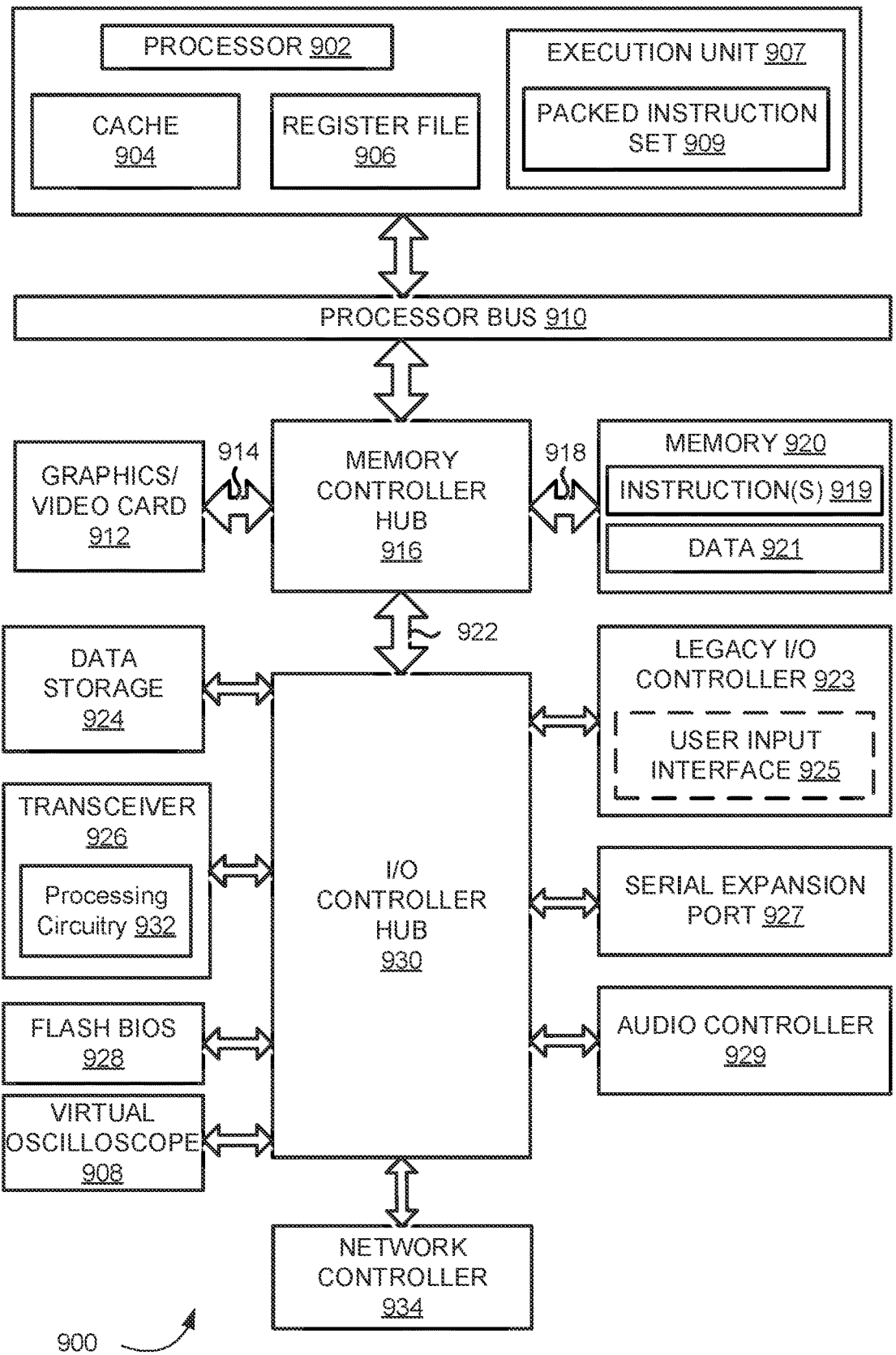
FIG. 9 illustrates an example computer system including a virtual wire system, in accordance with some embodiments of the present disclosure.

FIG. 9 illustrates a computer system 900 including a virtual wire system, in accordance with at least one embodiment. In at least one embodiment, computer system 900 may be a system with interconnected devices and components, an SOC, or some combination. In at least one embodiment, computer system 900 is formed with a processor 902 that may include execution units to execute an instruction. In at least one embodiment, computer system 900 may include, without limitation, a component, such as processor 902, to employ execution units including logic to perform algorithms for processing data. In at least one embodiment, computer system 900 may include processors, such as PENTIUM® Processor family, Xeon®, Itanium®, XScale® and/or StrongARM®, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of Windows® operating system available from Microsoft Corporation of Redmond, WA, although other operating systems (UNIX and Linux, for example), embedded software, and/or graphical user interfaces, may also be used.

In at least one embodiment, computer system 900 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 900 may be used in devices such as graphics processing units (GPUs), network adapters, central processing units, and network devices such as switches (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 900 may include, without limitation, processor 902 that may include, without limitation, one or more execution units 907 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 900 is a single processor desktop or server system. In at least one embodiment, computer system 900 may be a multiprocessor system. In at least one embodiment, processor 902 may include, without limitation, a CISC microprocessor, a RISC microprocessor, a VLIW microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. In at least one embodiment, processor 902 may also include a combination of both internal and external caches. In at least one embodiment, a register file 906 may store different types of data in various registers including, without limitation, integer registers, floating point registers, status registers, and instruction pointer registers.

In at least one embodiment, execution unit 907, including, without limitation, logic to perform integer and floating point operations, also resides in processor 902. Processor 902 may also include a microcode ("ucode") read-only memory ("ROM") that stores microcode for certain macro instructions. In at least one embodiment, execution unit 909 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In at least one embodiment, many multimedia applications may be accelerated and executed more efficiently by using the full width of a processor's data bus for performing operations on packed data, which may eliminate the need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 900 may include, without limitation, a memory 920. In at least one embodiment, memory 920 may be implemented as a DRAM device, an SRAM device, a flash memory device, or other memory devices. Memory 920 may store instruction(s) 919 and/or data 921 represented by data signals that may be executed by processor 902.

In at least one embodiment, a system logic chip may be coupled to processor bus 910 and memory 920. In at least one embodiment, the system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data, and textures. In at least one embodiment, MCH 916 may direct data signals between processor 902, memory 920, and other components in computer system 900 and to bridge data signals between processor bus 910, memory 920, and a system I/O 922. In at least one embodiment, a system logic chip may provide a graphics port for coupling to a graphics controller. In at least one embodiment, MCH 916 may be coupled to memory 920 through high bandwidth memory path 918, and graphics/video card 912 may be coupled to MCH 916 through an Accelerated Graphics Port ("AGP") interconnect 914.

In at least one embodiment, computer system 900 may use system I/O 922 which is a proprietary hub interface bus to couple MCH 916 to I/O controller hub ("ICH") 930. In at least one embodiment, ICH 930 may provide direct connections to some I/O devices via a local I/O bus. In at least one embodiment, a local I/O bus may include, without limitation, a high-speed I/O bus for connecting peripherals to memory 920, a chipset, and processor 902. Examples may include, without limitation, an audio controller 929, a firmware hub ("flash BIOS") 928, a transceiver 926, a data storage 924, a legacy I/O controller 923 containing a user input interface 925 and a keyboard interface, a serial expansion port 927, such as a USB, and a network controller 934. Data storage 924 may include a hard disk drive, a floppy disk drive, a CD-ROM device, a flash memory device, or other mass storage devices. In an embodiment, the transceiver 926 includes a constrained FFE 908.

In at least one embodiment, FIG. 9 illustrates a system, which includes interconnected hardware devices or "chips" in the transceiver 926—e.g., the transceiver 926 includes a chip-to-chip interconnect including the source device 410 and target device 510 as described with reference to FIG. 4). In at least one embodiment, FIG. 9 may illustrate an exemplary SoC. In at least one embodiment, devices illustrated in FIG. 9 may be interconnected with proprietary interconnects, standardized interconnects (e.g., PCIe), or some combination thereof. In at least one embodiment, one or more components of system 900 are interconnected using compute express link ("CXL") interconnects. In an embodiment, the transceiver 926 can include processing circuitry as described with reference to FIGS. 1-4. In such embodiments, the processing circuitry can facilitate a method for providing a virtual wire system, as described herein.

Other variations are within the spirit of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media, and one or more of individual non-transitory storage media of multiple non-transitory computer-readable storage media lacks all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "receiving," "providing," "obtaining," "using," or like, refer to action and/or processes of a computer or computing system, or similar electronic computing device, that manipulates and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, the terms "system" and "method" are used herein interchangeably insofar as the system may embody one or more methods, and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

The invention claimed is:

1. A virtual wire system comprising:
a source device comprising a plurality of data storage circuits corresponding to a plurality of source signals;
an encoder circuit to encode information of the plurality of source signals into a virtual wire waveform to be transmitted in a mesh message;
an arbiter circuit coupled between the plurality of data storage circuits and the encoder circuit, the arbiter circuit to select one or more source signals from the plurality of data storage circuits to be encoded into the virtual wire waveform;
a target device comprising a target circuit to decode the information from the virtual wire waveform into a one or more target signals; and
a mesh interface connecting the source device and the target device, wherein the mesh message is transmitted over the mesh interface from the source device to the target device, wherein the mesh message indicates at least a change in a value of a source signal of the plurality of source signals at the source device.

2. The virtual wire system of claim 1, wherein the encoder circuit is to receive first information pertaining to a first source signal of the plurality of source signals and second information pertaining to a second source signal of the plurality of source signals from the arbiter circuit, combine the first information and the second information into the virtual wire waveform, and provide the virtual wire waveform to a source mesh interface component in the source device.

3. The virtual wire system of claim 2, wherein the first information comprises one or more information elements selected from the group consisting of a payload, a target identifier, an information type identifier, a source identifier, and a protocol identifier.

4. The virtual wire system of claim 1, wherein the source device and the target device are selected from the group consisting of a processor, a memory controller, a graphics processor, a last level cache tile, a public key accelerator, a regular expression tile, a management gateway, a peripheral component interconnect express (PCIE) request node, and a memory subsystem, and the mesh interface comprises a two-dimensional compute subsystem (CSS) interface.

5. The virtual wire system of claim 2, wherein the source mesh interface component is further to receive the virtual wire waveform, generate the mesh message comprising the virtual wire waveform, and transmit the mesh message comprising the virtual wire waveform over a physical link of the mesh interface.

6. The virtual wire system of claim 1, wherein the target device further comprises:
a target mesh interface component to receive the mesh message, and extract the virtual wire waveform from the mesh message; and
a decoder circuit operatively coupled to the target mesh interface component, the decoder circuit to obtain the virtual wire waveform from the target mesh interface component, decode at least a payload from the virtual wire waveform, and provide at least the payload to a target data storage circuit in the target device.

7. The virtual wire system of claim 1, wherein the plurality of data storage circuits comprise a flip-flop circuit or a latch element, and the change in the value of the source signal comprises an interrupt.

8. A method comprising:
selecting, by an arbiter circuit coupled between a plurality of data storage circuits corresponding to a plurality of source signals and an encoder circuit, information pertaining to one or more of the plurality of source signals from the corresponding plurality of data storage circuits;
encoding, by the encoder circui, the information selected from the one or more of the plurality of source signals into a virtual wire waveform; and
transmitting, the virtual wire waveform over a mesh interface.

9. The method of claim 8, wherein the information comprises one or more information elements selected from the group consisting of a payload, a target identifier, an information type identifier, a source identifier, and a protocol identifier.

10. The method of claim 8, wherein the mesh interface comprises a two- dimensional compute subsystem (CSS) interface.

11. The method of claim 8, wherein transmitting the virtual wire waveform over the mesh interface further comprises generating a mesh message comprising the virtual wire waveform, and transmitting the mesh message comprising the virtual wire waveform over a physical link of the mesh interface.

12. The method of claim 11, further comprising:
receiving, by a target device, the mesh message;
extracting, by the target device, the virtual wire waveform from the mesh message;
decoding, by a target circuit of the target device, at least a payload from the virtual wire waveform; and
providing, by the target device, at least the payload to a target data storage circuit.

13. The method of claim 8, wherein the plurality of data storage circuits comprise a flip-flop circuit or a latch element, and a change in value of a signal level at a first data storage circuit of the plurality of data storage circuits comprises an interrupt.

14. A non-transitory computer-readable storage medium comprising instructions that, when executed by a processing device, cause the processing device to perform operations comprising:
selecting, by an arbiter circuit, one or more source signals of a plurality of source signals from a corresponding plurality of data storage circuits, wherein the arbiter circuit is coupled between the plurality of data storage circuits and an encoder circuit;
encoding, by the encoder circuit, information representing the one or more source signals into a virtual wire waveform; and
transmitting, the virtual wire waveform over a mesh interface.

15. The non-transitory computer-readable storage medium of claim 14, wherein the information comprises one or more information elements selected from the group consisting of a payload, a target identifier, an information type identifier, a source identifier, and a protocol identifier.

16. The non-transitory computer-readable storage medium of claim 14, wherein the mesh interface comprises a two-dimensional compute subsystem (CSS) interface.

17. The non-transitory computer-readable storage medium of claim 14, wherein transmitting the virtual wire waveform over the mesh interface further comprises generating a mesh message comprising the virtual wire waveform, and transmitting the mesh message comprising the virtual wire waveform over a physical link of the mesh interface.

18. The non-transitory computer-readable storage medium of claim 17, wherein the operations further comprise:
receiving, by a target device, the mesh message;
extracting the virtual wire waveform from the mesh message;
decoding, by a decoder circuit of the target device, at least a payload from the virtual wire waveform; and
providing at least the payload to a target data storage circuit.

19. The non-transitory computer-readable storage medium of claim 14, wherein the plurality of data storage circuits comprise a flip-flop circuit or a latch element, and a change in value of a signal level at a first data storage circuit of the plurality of data storage circuits comprises an interrupt.

* * * * *